UNITED STATES PATENT OFFICE.

HARRY H. ALEXANDER, OF WESTFIELD, NEW JERSEY, ASSIGNOR TO AMERICAN SMELTING & REFINING COMPANY, A CORPORATION OF NEW JERSEY.

PROCESS FOR RECOVERING TIN.

1,426,341. Specification of Letters Patent. Patented Aug. 22, 1922.

No Drawing. Application filed May 26, 1917, Serial No. 171,390. Renewed November 17, 1921. Serial No. 515,974.

*To all whom it may concern:*

Be it known that I, HARRY H. ALEXANDER, a citizen of the United States, and resident of Westfield, in the county of Union and State of New Jersey, have invented certain new and useful Improvements in Processes for Recovering Tin, of which the following is a specification.

This invention relates in general to the process of extracting metallic tin from the commercial tin concentrates.

The tin concentrates, and ores containing tin, which are at present delivered to the smelters for refining is usually in the form of finely divided particles and dust and contain varying and relatively large percentages of other elements and compounds, particularly ores containing copper, aluminum, iron, sulphur and silicate together with other elements in relatively small quantities.

The most improved process now practiced for obtaining tin economically and on a large scale is to charge the tin concentrates, together with a large mass of sand, lime and coal, into a reverbatory furnace which is fired in most plants by oil burners. This process is highly expensive not only in the necessity for using large masses of sand and lime, but in addition to the coal or other carbonaceous matter which must be fed with the charge and consumed as an incident of this process there must also be a continuous supply of oil or other fuel fed to the burners in order to maintain the necessary rapid combustion and intense heating effect. There results from this reverbatory furnace smelting an impure grade of tin together with a slag which is very high in tin content.

In order to abstract as much as possible of this tin present in the slag, the same is further treated with additional sand, lime and coal and is again passed through the reverbatory furnace. There results from this treatment of the slag, an alloy of tin and iron together with a slag which is low in tin. This resulting alloy is treated with sand, lime and ore and again smelted to oxidize the iron, resulting in the obtaining of an impure tin and a slag rich in tin. This resulting slag is again supplied with sand, lime and coal and the smelting of this mixture repeated as was described for the first treatment of the tin ore.

There is finally obtained a commercial form of tin containing some impurities and a slag.

It is usual to take the tin obtained as the result of the several steps in this old process, liquate the same, and cast into anodes in order to purify the tin by the electrolytic method now well known.

The final slag contains a certain percentage of tin which, while quite valuable, is so small that the expense of extracting the same by this old process is out of all proportion to the value recovered.

In the aggregate, however, large amounts of tin are lost in this final slag product. Sand and lime are quite expensive, and the large masses of these materials necessary to extract the tin by the old process makes the cost of extracting the tin almost prohibitive. Aside from this, however, there is the very material expense of handling the relatively large volumes of sand and lime, the necessity of using large furnaces to accommodate the same, and the necessity of repeatedly heating these large masses of neutral matter.

The sand and lime are finally in such a condition that they have little, if any, value, so that the cost of this sand and lime must be added to the other costs such as the cost of the fuel used incidental to the heating and handling operations.

The addition of lime and sand to the charge of concentrates increases the amount of slag formed and this slag containing as it does some tin, increases the loss of tin.

The primary object of the invention is to provide a simplified and relatively inexpensive method for obtaining a high grade of tin in metallic form from the finely divided ore concentrates now usually supplied to the smelters.

This object is attained broadly by what may be regarded as a two-step method. The first, and what may be regarded as a preparatory step, relates to a method for placing the ore in such a condition that when so treated it may be subjected to the action of a blast furnace without loss of the ore by the blowing action of the furnace, and the second step relates to the supplying of a prepared charge including the tin ore so treated to the action of a blast furnace.

More particularly defining the preparatory step, one process for preparing the commercial tin concentrates for the blast furnace, is to mix with the same a certain proportion of fuel, preferably in the form of coal and usually between seven and ten per cent by weight. This mixture is then sintered by any approved method, preferably by feeding the same to a sintering machine such as the Dwight-Lloyd machine. The sintering operation is so regulated that about 70 per cent of the sulphur is removed, thus leaving a material proportion of the original sulphur contents.

As at present understood, the presence of this sulphur or a similar acting substance is regarded as necessary to the success of the succeeding smelting operation.

A small amount of sulphur or similar acting element unites with impurities (such as copper, iron, etc.) thus producing a purer metal in the smelting, and overcomes the formation of objectionable alloys in the furnace.

Another chemical action which appears to take place during this sintering action is that the tin oxide present is partially reduced, some of it to metallic tin, and other portions to stannous compounds. There is also present in the finally sintered mass some stannic compounds, some of which were originally present in the concentrates. Another change effected by the sintering process is that the fine particles are more or less welded into a cake which becomes broken up by the dumping of the sintered charge from the end of the sintering machine. There is thus prepared a mass or charge of relatively large pieces, preferably about the size of pea coal. In this physical form the possibility of blowing off, which would take place if the tin ore in its originally finely divided state were fed to the blast furnace, is minimized and practically none of the ore is lost by the blowing action of the blast furnace.

The sintered and broken up ore product is then conveyed to a conventional form of water jacketed furnace and is fed to the furnace preferably with the addition of a charge of carbonaceous matter such as coke in the proportion of about fifteen to twenty, per cent by weight of coke.

In the plants where it is desired to extract all of the tin from the resulting slag hereinafter more fully described, a proportion of this resulting slag is added to the fresh ore and coke.

The blast furnace is maintained in continuous operation usually for several days and is tapped from time to time, and a high grade of tin is withdrawn together with a dross which floats on top of the tin. After each tapping the tin and dross discharge opening is plugged up as is usual in blast furnace operations. This dross appears to contain practically all of the impurities present in the original charge except the substances which come off in the slag.

Succeeding each tapping of the furnace for the tin and dross the furnace is tapped at a higher level for a resulting slag and this slag is withdrawn until the blast of sparks caused by the blowing of air from the air tuyers indicates that all of the melted material has been withdrawn from the furnace.

The slag outlet of the furnace is plugged and after a lapse of a certain time the operation is repeated. It is understood that the raw material is fed in at the top of the furnace continuously and the charge of metallic tin, dross and slag is withdrawn from time to time, depending upon the activity of the smelting operation.

The slag which has been thus withdrawn from the furnace is rich in tin and is refed back into the furnace from time to time with the addition of coke, or this slag is added together with the ore charge taken from the sintering machine as previously described.

Tin ore when smelted does not carry enough gangue to produce sufficient slag to protect the metal when reduced from reoxidization by the blast. Instead of adding sand and lime to form the additional slag necessary to protect the metal, the slag which has already passed through the furnace and contains values, is used, thus saving the values which are lost in making the additional slag from sand and lime; also saving the cost and expense of handling these inert materials.

By means of this process it is apparent that there has been eliminated the tying up of large quantities of tin in the slag heretofore described. This process requires a handling and heating of a much smaller mass of material and at the same time results in the production of a high grade of tin at a material reduction in cost over any known method. There has been eliminated the necessity of handling and resultant loss from large masses of inactive substances and a resulting saving not only in the cost of these inactive substances, but also in the expense of heating the same and a resulting saving in the tin charge carried off incidental to the old process.

The necessity of storing large quantities of fuel oil for the burners in the reverbatory furnaces has been saved and proportionately smaller furnaces are used, thus reducing the size of the plant necessary to handle a definite amount of the ore concentrates. Practically nothing is lost from the blast furnace, for even the gases discharged therefrom may be passed to a bag house and the metallic contents saved as usual with blast furnace operations.

While the resulting tin metal is of exceptionally high grade and is sold as commercial metal, this metal may be still further refined to eliminate all foreign substances by the usual electrolytic refining process, but this further refining constitutes no part of this process.

Having thus described my invention, I claim:

1. In the art of extracting metallic tin from tin concentrates, the process which consists in mixing the tin concentrates with carbonaceous material, sintering the mixture until approximately 70% of the sulphur originally contained in the mixture has been removed, breaking the resulting sintered mass into pieces sufficiently large to minimize the possibility of blowing off the tin concentrates when the same is fed to a blast furnace, mixing the sintered broken pieces with carbonaceous material, subjecting this mixture to a smelting operation of a blast furnace and separating the resulting products.

2. In the art of extracting metallic tin from tin concentrates, a process which consists in mixing the tin concentrates with reducing material, sintering the mixture until a relatively small percentage of the tin oxide is reduced and a relatively large percentage of the sulphur originally contained in the ore is removed, breaking the sintered mass into lumps, mixing said lumps with reducing material and subjecting this mixture to the action of a blast furnace, and separating the resulting products.

3. In the art of extracting tin from a slag resulting from the subjection of tin concentrates to the action of a blast furnace, the process which consists in mixing such slag with sintered tin concentrates and a carbonaceous material and subjecting the mixture to the smelting operation of a blast furnace.

4. In the art of extracting tin from a slag resulting from subjecting tin concentrates to the action of a blast furnace, the process which consists in mixing such slag with tin concentrates and a reducing material and subjecting the mixture to the action of a blast furnace.

5. In the art of extracting metallic tin from tin concentrates in a blast furnace, the process which consists in sintering concentrates with a reducing material until a portion of the sulphur originally contained in the ore is removed and continuously feeding said sintered material and a reducing agent to a blast furnace and intermittently tapping the blast furnace.

6. In the art of extracting metallic tin from tin concentrates in a water-jacketed blast furnace, the process which consists in sintering the tin concentrates with a reducing material until a relatively small portion of the tin oxide is reduced and a relatively large portion of the sulphur originally contained in the ore is removed, breaking the sintered mass into lumps, and continuously feeding said lumps and a reducing material into a blast furnace, and intermittently tapping the blast furnace to withdraw the tin and the slag separately.

Signed at Perth Amboy, in the county of Middlesex and State of New Jersey, this 12th day of May, A. D. 1917.

HARRY H. ALEXANDER.